United States Patent [19]

Roodenrijs

[11] Patent Number: 4,774,008
[45] Date of Patent: Sep. 27, 1988

[54] APPARATUS FOR SEPARATING A MIXTURE INTO SOLID AND LIQUID COMPONENTS

[75] Inventor: Jack P. Roodenrijs, St. Michielsgestel, Netherlands

[73] Assignee: Grenco Process Technology, B.V., Hertogenbosen, Netherlands

[21] Appl. No.: 51,796

[22] Filed: May 20, 1987

[30] Foreign Application Priority Data

Jan. 30, 1987 [NL] Netherlands .......................... 8700241

[51] Int. Cl.$^4$ .................... B01D 21/06; B01D 35/00
[52] U.S. Cl. .................................... 210/770; 62/543; 100/145; 210/791; 210/172; 210/260; 210/408; 210/415
[58] Field of Search ............... 210/251, 172, 252, 260, 210/407, 408, 413, 415, 791, 769, 770; 100/145–150; 62/541, 543, 532

[56] References Cited

U.S. PATENT DOCUMENTS

| | | |
|---|---|---|
| 3,872,009 | 3/1975 | Thijssen . |
| 3,902,962 | 9/1975 | Reinhall .............................. 210/413 |
| 4,004,886 | 1/1977 | Thijssen . |
| 4,385,914 | 5/1983 | Hewitt et al. .......................... 62/541 |
| 4,406,679 | 9/1983 | Wrobel . |
| 4,557,741 | 12/1985 | Van Pelt . |

*Primary Examiner*—Frank Sever
*Attorney, Agent, or Firm*—Cushman, Darby & Cushman

[57] ABSTRACT

An apparatus for separating a mixture of solid and liquid components including a tank for the mixture with at least one inlet for the mixture under pressure and at least one outlet. One or more separators are provided within the tank and including one or more circular-cylindrical filter elements within the tank. Each of the filters includes a wall portion which is permeable to the liquid component of the mixture. Further, a helical transporting and scraping element is mounted within the circular-cylindrical wall of the filter and is sized so as to scrape the solid component of the mixture as cake from the inner wall of the filter and return it to the mixture within the tank.

17 Claims, 1 Drawing Sheet

APPARATUS FOR SEPARATING A MIXTURE INTO SOLID AND LIQUID COMPONENTS

BACKGROUND OF THE INVENTION

The present invention relates to an apparatus for separating a mixture into solid and liquid components and, more particularly, to a separating apparatus which includes a filter permeable to the liquid component against which the mixture is urged to separate the liquid component. The solid component is subsequently scraped from the filter wall.

Separating devices of this type are known, generally, as for example as shown in Dutch Patent No. 148,242 which is directed in particular to equipment for freezing a solvent out of a solution.

In this kind of freeze concentrating equipment, which is used, for example, to freeze concentrate beverages and to purify chemicals and the like, a rotating circular-cylindrical filter is mounted within a separating tank so that one end of the interior space defined by the filter is placed in communication with the tank outlet. The mixture is then urged under pressure against the outer surface of the filter. The solid components remain on the outside surface of the filter, within the tank, while the liquid component passes through the filter and to the outlet of the tank. The solid components which collect on the outer surface of the filter are then scraped off by a stationary scraper as the circular-cylindrical filter rotates.

However, because the scraper does not positively urge the solid material toward and into the mixture within the tank, the cake of solid components which has been scraped off the filter wall in this device must be reintroduced into the mixture during the concentrating process. Indeed, the solid material will tend to collect adjacent the scraper since little or no influence can be made on the reintroduction of the filter cake scraped off.

SUMMARY OF THE INVENTION

It is therefore an object of the present invention to overcome the disadvantages set forth above by providing an apparatus for separating a mixture of solid and liquid components which provides a means for positively returning the scraped filter cake to the mixture being processed.

The foregoing object is achieved in accordance with the present invention by providing a filter or sieve device of circular-cylindrical shape but which remains stationary within the separating tank. The sieve or filter is permeable to the liquid component so that a mixture delivered to the interior space of the filter and pressed against the wall thereof will separate into a liquid component and a solid component.

A helical scraper is rotatably mounted within the filter element and such that the filter cake remaining on the filter walls following separation is loosened and conveyed to one end of the space defined by the circular-cylindrical wall of the filter. The end of the filter to which the solid component is conveyed is open to the tank interior. Thus, the solid material is urged toward and, accordingly, automatically returned to the tank. The liquid component which has passed through the filter, on the other hand, is conveyed to an outlet passage and away from the tank. A mixer is preferably provided in the tank for uniformly recombining the reintroduced cake material with the mixture being separated.

Other objects, features, and characteristics of the present invention, as well as the methods of operation and functions of the related elements of the structure, and the combination of parts and economies of manufacture, will become more apparent upon consideration of the following description and the appended claims with reference to the accompanying drawings, all of which form a part of this specification, wherein like reference numerals designate corresponding parts in the various figures.

DETAILED DESCRIPTION OF THE PRESENTLY PREFERRED EXEMPLARY EMBODIMENT

Figure 1:
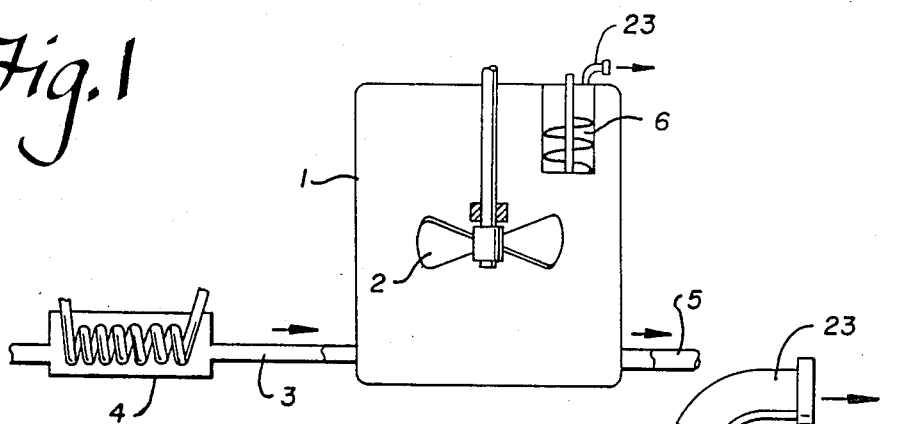
FIG. 1 is a diagramatic side elevational view, partly broken away for clarity, of a separation tank with a filter device formed in accordance with the present invention mounted therein.

Referring, for example, to the separation process utilized in freeze concentrating equipment wherein separation takes place on the basis of freezing water out of a crystalizable solution as shown generally in, for example, Dutch Patent No. 148,242, a separation tank provided in accordance with the present invention is a recrystallization tank 1 which includes a stirring element 2, as shown schematically in FIG. 1. An inlet pipe 3 is provided through which a mixture from a heat exchanger 4 wherein small ice crystals are formed in the mixture is delivered to the recrystallization tank 1. An outlet pipe 5 is also provided for removing the suspension from the recrystallization tank 1.

A separator 6 formed in accordance with the present invention is preferably installed at the top of tank 1, as will be described more particularly with reference to FIG. 2 below.

Figure 2:
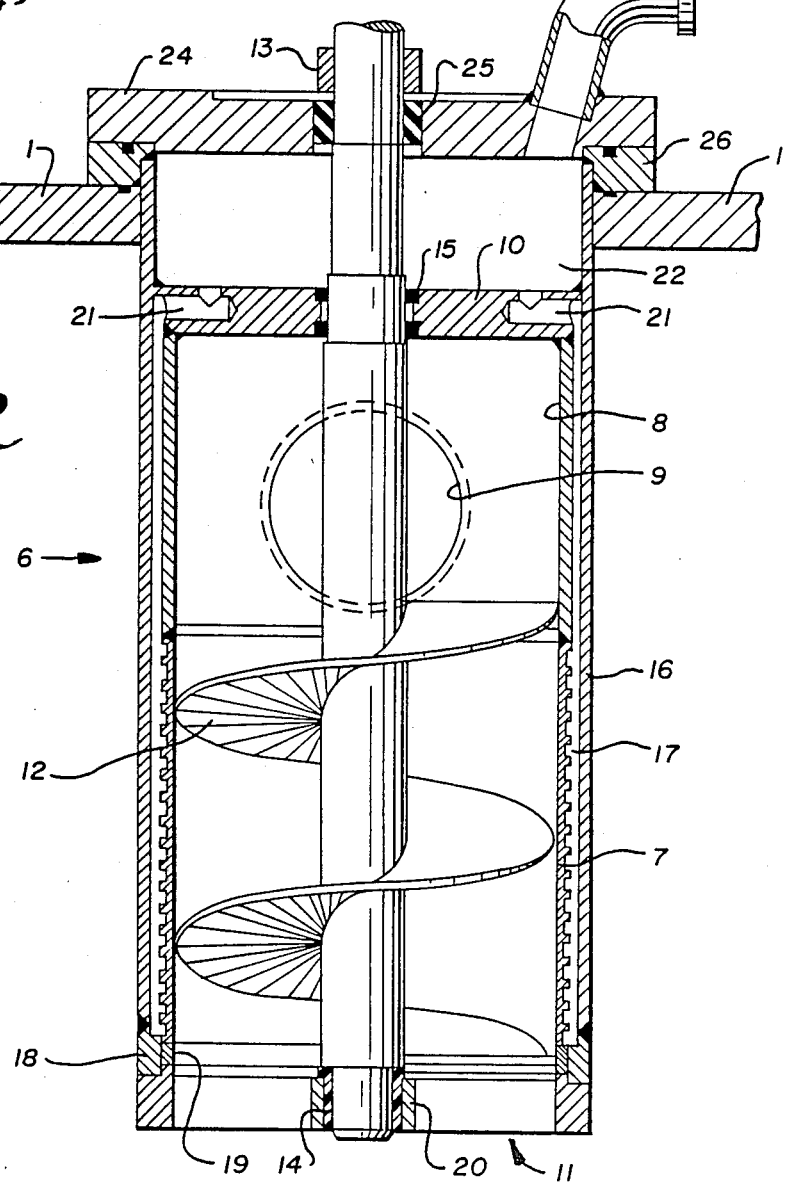
FIG. 2 is a side elevational view, partly in cross-section, of a filter device formed in accordance with the present invention.

Turning to FIG. 2, separator 6 includes a conventional circular-cylindrical filter element 7 which is permeable to the liquid component of the mixture. Filter 7 is coupled at one end thereof to a solid cylindrical wall 8 which defines aperture(s) that provide one end of passage(s) 9 for guiding material to be separated into the interior of filter element 7, as described more fully below. The other end of cylindrical wall 8 is sealed by a partition 10 so as to define a chamber within filter 7, closed at one end by partition 10 and open at a second end 11, within tank 1.

A helical scraper 12 sized so as to scrape material off the interior wall of the filter element 7 is mounted at one end thereof to a suitable device (not shonn) for rotating the same relative to filter 7. Further, the opposite ends of scraper 12 are maintained in alignment with filter 7 through suitable bearings 13 and 14. In addition, a seal 15 is preferably mounted in partition 10 so that the stem of scraper 12 can be rotatably received in fluid tight relation.

A solid wall 16 is coaxially mounted about filter 7 and wall 8 so that an annular space 17 is defined between filter 7 and wall 8 and wall 16. Annular space 17 is sealed adjacent the open end of filter 7 by suitable means such as a flange 18 and/or a ring seal 19 provided adjacent the ends of filter 7 and wall 16. Furthermore a suitable flow through end cap 20 is preferably provided at the base of separator 6 and coupled to wall 16 for receiving bearing 14 and the stem of scraper 12. An upper end of space 17 opens to one or more passages 21 defined in partition 10. Passages 21 enable fluid passing under the influence of pressure in tank 1 through filter 7 and annular space 17 to a chamber 22 which is in turn coupled to an outlet 23 of separator 6.

The mixture to be separated which is under pressure in tank 1 is introduced to the interior of the filter by one or more passages 9 defined so as to extend through apertures defined in wall 16 and wall 8 but sealed from communication with annular space 17 as was discussed above.

Finally, a cover 24 is provided as an uppermost wall defining of chamber 22 and includes an axial seal 25 which prevents separated liquid from emerging outwardly relative to separator 6. Cover 24 and flanged rim 26 of wall 16 are themselves coupled to the wall of tank 1.

In use, because of the pressure present in tank 1, the mixture enters the separator 6 via passage(s) 9 and the liquid passes through filter 7 toward and out of outlet 23 via space 17, passages 21 and chamber 22. The ice crystals thus form a cake on the inner surface of filter wall 7. Helical scraper 12 is continuously or intermittent rotated in a direction such that the solid material on the filter walls is moved downwardly towards open end 11 and the center of tank 1. Thus, the cake material is possitively reintroduced into tank 1 and mixed therein by mixer 2, for example, and can again be introduced into separator 6 through passage(s) 9 to remove even more liquid therefrom.

The helical scraper can be separated from the filter walls, for example by 1 to 2 mm, particularly for separating beverages such as beer which do not have pulp. This reduces mechanical wear. For pulp containing beverages such as orange juice it is necessary for the scraper to touch and scrape the wall.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, the scraper can be made with vertical blades extending between adjacent vertical positions of the helical blade. Further, although FIG. 1 shows only a single separator 6, more than one such filter can be provided. In addition, the separator formed in accordance with the present invention can be provided at the bottom of tank 1 rather than at the top thereof by simply inverting separator 6 and mounting it to the bottom wall of tank 1.

What is claimed is:

1. A system for separating a mixture into solid and liquid components, comprising:
    means for positively returning a filter cake to a misture being treated in a freeze concentrating apparatus, including, a tank for receiving a mixture to be separated, said tank having at least one inlet for the mixture under pressure and at least one outlet; and
    a separator means mounted to a wall of said tank and including at least one filter element having an open end, a closed end and a circular-cylindrical wall permeable to the liquid component of the mixture, passage means for guiding material to be separated from the interior of the tank into the interior of said filter element, a transporting and scraping means rotatably mounted to said filter element for scraping solid components of the mixture from the interior surface of the filter element and for urging the solid components toward and into the interior of said tank, and means defining a passage for receiving the liquid component of the mixture which has pased through the wall of the filter element.

2. A system as in claim 1, further comprising a wall element mounted in surrounding relation to a said filter element for defining therebetween said pasage means.

3. A system as in claim 2, wherein said wall element is cylindrical whereby said passage means for the liquid component is annular in shape.

4. A system as in claim 3, wherein said filter element and said surrounding wall define apertures and further including a tubular element fluidly coupled to said apertures and extending between said wall element and said filter element for providing an inlet sealed off from said passage means to the interior of said filter element.

5. A system as in claim 1, wherein said scraping means comprises a helical scraper operatively coupled to the filter element so as to rotate within the interior space defined thereby and to scrape solid components of the mixture from the interior surface of the filter.

6. A system as in claim 5 wherein said scraper is separatd by 1-2 mm from the interior surface of said filter element.

7. A system as in claim 5 wherein said scraper touches and scrapes the solid componednts of the mixture from the interior surface of said filter element.

8. A system as in claim 1, further comprising a heat exchanger means operatively coupled to said inlet of said tank for forming ice crystals in the mixture before the mixture is introduced into the tank.

9. A system as in claim 1, further comprising means for mixing the mixture within the tank.

10. A method for separating a mixture into solid and liquid components, comprising the steps of:
    positively returning a filter cake to a mixture being treated in a freeze concentrating process, by, conveying a mixture to be separated under pressure to a tank having at least one inlet for the mixture and at least one outlet;
    introducing the mixture into the interior of a separator mounted to a wall of the tank and including at least one filter element having a circular-cylindrical wall permeable to the liquid component of the mixture, a transporting and scraping means rotatably mounted within said filter element for scraping solid components of the mixture from the interior surface of the filter element and for urging the solid components toward the interior of the tank;
    rotating said transporting and scraping means to scrape solid components of the mixture from the interior surface of the filter and to urge the solid components towards the interior of the tank; and
    conveying the liquid compenent of the mixture which has passed through the filter element through a passage away from the interior of the tank.

11. A method as in claim 10, further comprising mixing the mixture within the tank prior to said step of introducing said mixture to said separator.

12. A method as in claim 10, further comprising the steps of conveying the mixture to a heat exchanger and forming ice crystals in the mixture before the step of delivery to the tank.

13. A separator for separating a mixture into solid and liquid components, comprising:

means for positively returning a filter cake to a mixture being treated in a freeze concentrating apparatus, including, at least one filter element having an open end, a closed end, and a circular-cylindrical wall permeable to the liquid component of the mixture;

a transporting and scraping means rotatably mounted to said filter element for scraping solid components of the mixture from the interior surface of the filter element and for urging the solid components toward and out of the opened end of said filter element; and means defining a passage for receiving a liquid component of the mixture which has passed through the filter element.

14. A separator as in claim 13, further comprising a wall element mounted in surrounding relation to said filter element for defining therebetween said passage means.

15. A separator as in claim 14, wherein said wall element is cylindrical whereby said passage means for the liquid component is annular in shape.

16. A separator as in claim 15, wherein said filter element and said surrounding wall define apertures and further including a tubular element fluidly coupled to said apertures and extending between said wall element and said filter element for providing an inlet sealed off from said passage means to the interior of said filter element.

17. A separator as in claim 13, wherein said transporting and scraping means comprises a helical scraper mounted for rotation reiative to said filter element.

* * * * *